(12) United States Patent
Noguet et al.

(10) Patent No.: US 10,237,869 B2
(45) Date of Patent: Mar. 19, 2019

(54) METHOD OF TRANSMITTING A FREQUENCY PLAN IN A TELECOMMUNICATION SYSTEM

(71) Applicant: Commissariat à l'Energie Atomique et aux Energies Alternatives, Paris (FR)

(72) Inventors: Dominique Noguet, Saint-Simeon-de-Bressieux (FR); Jean-Baptiste Dore, Saint-Martin-le-Vinoux (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 10 days.

(21) Appl. No.: 15/046,540

(22) Filed: Feb. 18, 2016

(65) Prior Publication Data
US 2016/0249360 A1    Aug. 25, 2016

(30) Foreign Application Priority Data

Feb. 19, 2015   (FR) ...................................... 15 51405

(51) Int. Cl.
*H04W 72/04*    (2009.01)
*H04L 5/00*    (2006.01)

(52) U.S. Cl.
CPC ....... *H04W 72/0453* (2013.01); *H04L 5/0041* (2013.01); *H04L 5/0094* (2013.01);
(Continued)

(58) Field of Classification Search
CPC ............. H04W 72/0453; H04L 5/0094; H04L 5/0041; H04L 5/0044; H04L 5/001; H04L 5/0007
See application file for complete search history.

(56) References Cited

U.S. PATENT DOCUMENTS 5,315,584 A * 5/1994 Savary ................... H04J 3/1682
                                                                370/208
6,442,214 B1 * 8/2002 Boleskei ............... H04B 7/0854
                                                                375/260
(Continued)

FOREIGN PATENT DOCUMENTS

WO    WO 2011146840 A1 *  11/2011   ........... H04L 1/0009

OTHER PUBLICATIONS

"Radio Proitocols for LTE and LTE-Advanced"; Seung June Yi, et al; Jan. 1, 2012; Wiley, Singapore; pp. 237-259.
(Continued)

*Primary Examiner* — Tejis Daya
(74) *Attorney, Agent, or Firm* — Moreno IP Law LLC

(57) ABSTRACT

A method of remote data transmission over a frequency spectrum divided into a plurality of different elementary channels, between a first device and a second device, including the transmission by the first device of a first signal including a succession of first data by modulation of the first data simultaneously over a number of elementary channels of the plurality of elementary channels and the transmission of a second signal representative of a plan of use of the plurality of elementary channels including a succession of second data at least by modulation of all the second data over a single elementary channel from among said number of elementary channels.

11 Claims, 3 Drawing Sheets

(52) U.S. Cl.
CPC ............ *H04L 5/001* (2013.01); *H04L 5/0007* (2013.01); *H04L 5/0044* (2013.01)

(56) References Cited

U.S. PATENT DOCUMENTS

| | | | | |
|---|---|---|---|---|
| 8,077,646 | B1* | 12/2011 | Cendrillon | H04L 25/03159 370/310 |
| 2005/0113023 | A1* | 5/2005 | Bassompiere | H04L 1/0003 455/20 |
| 2006/0130107 | A1* | 6/2006 | Gonder | H04L 29/06027 725/110 |
| 2006/0193268 | A1* | 8/2006 | Walton | H04B 7/04 370/264 |
| 2007/0025398 | A1* | 2/2007 | Yonge, III | H04B 3/54 370/508 |
| 2007/0121567 | A1* | 5/2007 | Venkatachalam | H04L 5/023 370/343 |
| 2007/0249298 | A1* | 10/2007 | Sawada | H04B 1/56 455/103 |
| 2008/0240216 | A1* | 10/2008 | Kolding | H04L 1/0026 375/227 |
| 2009/0075664 | A1* | 3/2009 | Palanki | H04L 5/0044 455/446 |
| 2010/0091702 | A1* | 4/2010 | Luo | H04J 11/0069 370/328 |
| 2010/0124254 | A1* | 5/2010 | Wu | H04L 5/003 375/131 |
| 2011/0158354 | A1* | 6/2011 | Yokokawa | H04L 1/0052 375/340 |
| 2011/0286544 | A1* | 11/2011 | Avudainayagam | H04L 1/0009 375/295 |
| 2011/0287802 | A1* | 11/2011 | Ma | H04L 5/0066 455/517 |
| 2012/0051309 | A1* | 3/2012 | Kim | H04W 36/06 370/329 |
| 2012/0063373 | A1* | 3/2012 | Chincholi | H04L 5/001 370/281 |
| 2014/0226607 | A1* | 8/2014 | Holma | H04L 1/1812 370/329 |
| 2014/0348268 | A1* | 11/2014 | Siohan | H04L 27/2633 375/298 |
| 2015/0163164 | A1* | 6/2015 | Tzannes | H04L 1/0025 375/222 |
| 2016/0056984 | A1* | 2/2016 | Liberg | H04L 27/20 375/302 |
| 2016/0330265 | A1* | 11/2016 | Abdoli | H04L 5/0028 |

OTHER PUBLICATIONS

Preliminary Search Report filed in FR 15/51405; dated Jan. 19, 2016; 2 pgs.

* cited by examiner

METHOD OF TRANSMITTING A FREQUENCY PLAN IN A TELECOMMUNICATION SYSTEM

This application claims the priority benefit of French patent application number 15/51405, filed on Feb. 19, 2015, the contents of which is hereby incorporated by reference in its entirety to the maximum extent allowable by law.

BACKGROUND

The present disclosure relates to a method of transmitting a frequency plan between a master device and a slave device of a telecommunication system, for example, a broadcasting system or a wireless network. The present disclosure also relates to a master device of a telecommunication system implementing such a frequency plan transmission method.

DISCUSSION OF THE RELATED ART

FIG. 1 partially and schematically shows a telecommunication system 10 comprising a first device 12 capable of transmitting signals to at least one second device 14 over a transmission channel 16, for example, a wireless link 16 or a wired link. To allow the simultaneous transmission of a plurality of signals over telecommunication system 10, the spectrum of frequencies usable by telecommunication system 10 may be divided into different transmission channels, the signals then being transmitted over different channels. Call frequency plan the set of data describing the frequency allocation of the channels used by device 12 and which should be known by device 14 to communicate either with device 12 or with another or other device(s) 14. The frequency plan corresponds to the plan of frequency allocation of the usable elementary channels of telecommunication system 10, that is, to the plan of assignable frequencies of telecommunication system 10. As an example, device 12 can modify the frequency plan and is called master device while device 14 has to follow the frequency plan to be part of telecommunication system 10 and is called slave device. In particular, the frequency plan may indicate the channels over which slave device 14 is allowed to transmit. Slave device 14, when it first takes part in telecommunication system 10, does not know the frequency plan and should determine it to correctly receive the signals transmitted by master device 12, to remotely exchange data with master device 12 and/or to exchange data with another or other slave device(s).

An example of telecommunication system 10 corresponds to a broadcasting system where master device 12 unilaterally transmits signals to a large number of slave devices 14. Master device 12 may then correspond to a television transmitter and slave device 14 may then correspond to a television set. Another example of telecommunication system corresponds to a wireless network, for example, a mobile telephony network. Master device 12 may then correspond to a mobile telephony relay (or base station) and slave device 14 may correspond to a cell phone.

The frequency spectrum used by telecommunication system 10 for the signal exchange may be divided into N different transmission channels, where N is an integer. Only some of the N transmission channels may be used by devices 12, 14 of telecommunication system 10.

FIG. 2 schematically shows an example of a frequency spectrum of a telecommunication system 10 comprising five transmission channels $C_1$ to $C_5$. Further, FIG. 2 schematically shows a first signal 18 transmitted over channel $C_1$, a second signal 20 transmitted over channel $C_4$, and a third signal 22 transmitted over channel $C_5$.

When a new slave device desires to take part in telecommunication system 10, it does not know over which channels signals 18, 20, 22 are transmitted. To determine the frequency plan used by telecommunication system 10, a known method comprises, for slave device 14, performing a scanning operation by successively determining for each transmission channel $C_1$ to $C_5$ whether a signal is transmitted over the transmission channel and, when this is true, the nature of this signal. The frequency plan may be stored in a memory of slave device 14. Considering that slave device 14 determines the nature of a signal transmitted over a channel within a time period $T_e$, the time taken to scan all the channels of the frequency spectrum of telecommunication system 10 is $N.T_e$.

For certain applications, the frequency spectrum used by telecommunication system 10 is divided into elementary transmission channels and the transmission of a signal is performed by modulating this signal simultaneously on a plurality of elementary channels. To achieve this, a multi-carrier modulation may be implemented. The frequency spectrum used for the signal exchange by devices 12, 14 of telecommunication system 10 is called fragmented spectrum. In particular, for each transmitted signal, the elementary channels used for the signal transmission may be consecutive or separate. This especially enables to transmit a wideband signal over a plurality of separate elementary channels each having a bandwidth smaller than that of the signal to be transmitted. On the receive side, slave device 14 has to recover the data transmitted over each elementary channel used for the transmission to be able to properly determine the transmitted signal. The frequency plan identifies the elementary channels used for the transmission of each signal capable of being transmitted by devices 12, 14 of telecommunication system 10. An example of a fragmented spectrum corresponds to television white spaces, TVWS, where a slave device 14 is allowed, in certain countries, to transmit signals in the frequency ranges which are not used for other purposes, particularly for the transmission of television signals.

FIG. 3 schematically shows an example of a frequency spectrum of a fragmented spectrum telecommunication system 10 comprising five transmission channels $F_1$ to $F_5$. A useful signal 24 which is simultaneously transmitted by modulation over the three elementary channels $F_1$, $F_4$, and $F_5$ has been shown. As appears in FIG. 3, some of the elementary channels used for the transmission of the useful signal may not be contiguous.

It cannot be envisaged for a slave device 14 desiring to form part of telecommunication system 10 to implement the previously-described scanning method. Indeed, considering that the frequency spectrum is divided into n elementary channels, each elementary channel may be part of a combination of elementary channels used or not for the transmission of a signal. In this case, for slave device 14, identifying the combinations of elementary channels amounts to testing $N=2^n-1$ combinations. The duration of the scanning operation is then equal to $N.T_e=(2^n-1).T_e$ and becomes excessive as soon as the number of elementary channels is high. As an example, in the case of TVWS, the ultra-high frequency band (UHF) used extends in Europe from 470 MHz to 790 MHz and is divided into 40 channels of 8 MHz each. Considering that an 8-MHz channel is totally used or is not used at all for the transmission of a signal, the duration of the scanning operation is $(2^{40}-1).T_e$. Considering that each 8-MHz channel is itself divided into 2-MHz elementary channels capable of being used separately, the duration of the scanning operation becomes $(2^{160}-1).T_e$. Even considering that a slave device cannot address the entire frequency spectrum but, for example, only a 40-MHz window at a given time, the duration of the scanning operation in this window is $(2^{20}-1).T_e$ with a 2-MHz elementary channel. Since this window may occupy 141 positions, the total duration of the scanning operation in this window is $141.(2^{20}-1).T_e$. In all the previously-indicated examples, the scanning duration becomes rapidly incompatible with a proper operation of the telecommunication system.

Another known method comprises, for master device 12, using a dedicated transmission channel over which a specific signal, called beacon, containing the frequency plan, is transmitted. It is a determined transmission channel having a position in the frequency spectrum known by master device 12 and by each slave device 14. Such a dedicated channel is used to exchange control information. Each slave device 14, desiring to take part in telecommunication system 10, directly recovers the beacon over the dedicated channel. A disadvantage of such a method of transmitting the frequency plan is that part of the spectral available resources of telecommunication system 10 is only used by the channel dedicated to transmitting the beacon. However, the spectral resources may be limited and reserving part of the spectral resources to a channel dedicated to the beacon transmission may be impossible, or at least inefficient.

SUMMARY

The present disclosure aims at overcoming all or part of the disadvantages of previously-described methods of transmitting a frequency plan used by a fragmented spectrum telecommunication system.

Another object of an embodiment is to allow a slave device of a fragmented spectrum telecommunication system to recover a frequency plan within a small time.

Another object of an embodiment is not to require a channel dedicated to the transmission of a beacon containing the frequency plan.

Thus, an embodiment provides a method of remote data transmission over a frequency spectrum divided into a plurality of different elementary channels, between a first device and a second device, comprising the transmission by the first device of a first signal comprising a succession of first data by modulation of the first data simultaneously over a number of elementary channels of the plurality of elementary channels and the transmission of a second signal representative of a plan of use of the plurality of elementary channels comprising a succession of second data at least by modulation of all the second data over a single elementary channel from among said number of elementary channels.

According to an embodiment, the modulation is a multi-carrier modulation.

According to an embodiment, the second device successively determines, for each elementary channel from among at least certain elementary channels of the plurality of elementary channels, whether all the second data have been transmitted by modulation over said elementary channel.

According to an embodiment, the method comprises transmitting the second signal independently by modulation of all the second data over each of at least two unique elementary channels from among the plurality of elementary channels.

According to an embodiment, each elementary channel comprises carriers, the method comprising a step of determining first symbols based on the first data, a step of distributing the first symbols over first carriers associated with a number of elementary channels of the plurality of elementary channels, and a step of modulating the first carriers with the first symbols, the method further comprising a step of determining second symbols based on the second data, a step of distributing the second symbols over at least second carriers associated with said unique elementary channels, and a step of modulating the second carriers with the second symbols.

According to an embodiment, the method comprises modulating the carriers other than the second carriers with a no-data-transmission symbol.

According to an embodiment, the method comprises modulating with the second symbols at least third carriers different from the second carriers and contained in an elementary channel different from said unique elementary channel.

According to an embodiment, the method further comprises a step of transmitting fourth data representative of a new plan of use of the plurality of elementary channels by modulation over said unique elementary channel and representative of a time of beginning of use of the new plan of use and, from said time, transmitting fifth data representative of the new plan of use by modulation of the fifth data over a new unique elementary channel different from said unique elementary channel.

According to an embodiment, the modulation is an OFDM modulation, an FBMC modulation, or a UFMC modulation.

According to an embodiment, at least two elementary channels of said number of elementary channels are separated by at least one elementary channel of the plurality of elementary channels on which the first data are not modulated.

An embodiment also provides a device of remote data transmission over a frequency spectrum divided into a plurality of different elementary channels comprising a circuit capable of transmitting a first signal comprising a succession of first data by modulation of the first data simultaneously over a number of elementary channels of the plurality of elementary channels and capable of transmitting a second signal representative of a plan of use of the plurality of elementary channels comprising a succession of second data at least by modulation of all the second data over a single elementary channel from among said number of elementary channels.

An embodiment also provides a system of remote data transmission over a frequency spectrum divided into a plurality of elementary channels, comprising at least a first device such as previously defined and at least a second device capable of successively determining, for each elementary channel from among at least certain elementary channels of the plurality of elementary channels, whether all the second data have been transmitted by modulation over said elementary channel.

The foregoing and other features and advantages will be discussed in detail in the following non-limiting description of specific embodiments in connection with the accompanying drawings.

DETAILED DESCRIPTION

Figure 1:
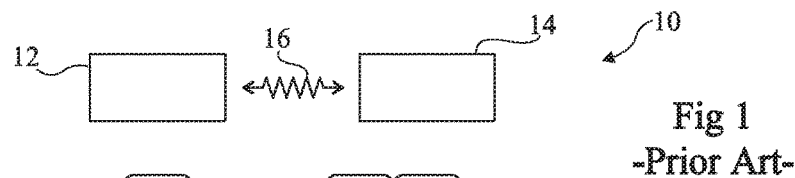
FIG. 1, previously described, partially and schematically shows two devices of a telecommunication system.
Figure 2:
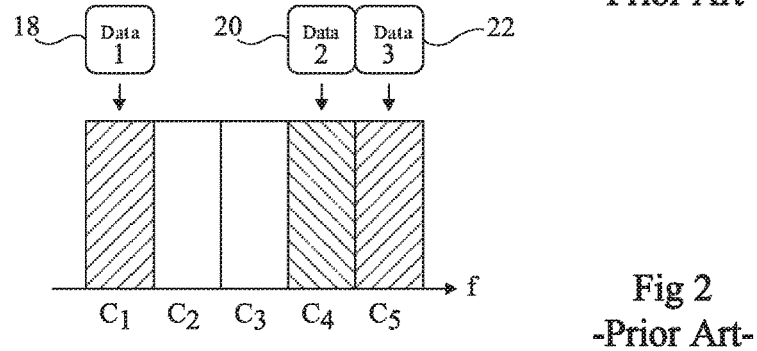
FIG. 2, previously described, partially and schematically shows an example of a frequency spectrum implemented by a non-fragmented spectrum telecommunication system.

The same elements have been designated with the same reference numerals in the different drawings. For clarity, only those elements which are useful to the understanding of the described embodiments have been shown and are detailed. In particular, coding, amplitude- or phase-modulation, multicarrier modulation methods are well known by those skilled in the art and will not be described in detail. Unless otherwise specified, expressions "approximately", "substantially", and "in the order of" mean to within 10%, preferably to within 5%. In the following description, unless otherwise mentioned, "useful signals" designates signals transmitted by the master device other than the beacon. In the following description, for a multicarrier modulation method, "digital symbol" designates the symbol which is modulated on a carrier. In the case of a multicarrier modulation, for example, a modulation by coding of digital signals by orthogonal frequency-division multiplexing or OFDM, or any other modulation using a carrier multiplexing, particularly a multicarrier filter bank modulation or FBMC, or a UFMC modulation (Universal Filtered Multicarrier), "multicarrier symbol" designates the vector having its components corresponding to the digital symbols simultaneously transmitted over different carriers. Further "symbol '0'" designates a digital symbol resulting in no data transmission after modulation.

According to an embodiment of a method of signal transmission by a fragmented spectrum telecommunication system, no channel dedicated to the transmission of a beacon containing the frequency plan is used. The beacon is transmitted over the frequency spectrum also used for the transmission of useful signals. However, the beacon is totally transmitted by master device 12 over a single elementary channel while each other useful signal may be transmitted by simultaneous modulation over a plurality of elementary signals. The single elementary channel used to transmit the beacon may also be used, with other elementary channels, for the transmission of a useful signal. Thereby, a slave device 14 desiring to know the frequency plan used by fragmented spectrum telecommunication system 10 successively scans each elementary channel until it receives the beacon. Slave device 14 determines the frequency plan after demodulation and decoding of the beacon and can store the frequency plan thus determined. The slave device thus does not have to examine all the combinations of elementary channels, but just has to scan the n elementary channels forming the frequency spectrum used by telecommunication system 10. The maximum duration of the method of determining the frequency plan is thus decreased to $n.T_e$.

Figure 3:
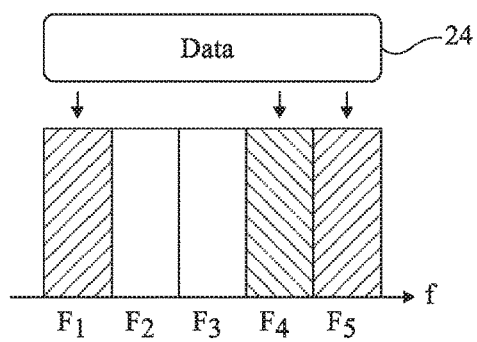
FIG. 3, previously described, partially and schematically shows an example of a frequency transmission spectrum implemented by a fragmented spectrum telecommunication system, with a distribution of the data over a plurality of fragments.
Figure 4:
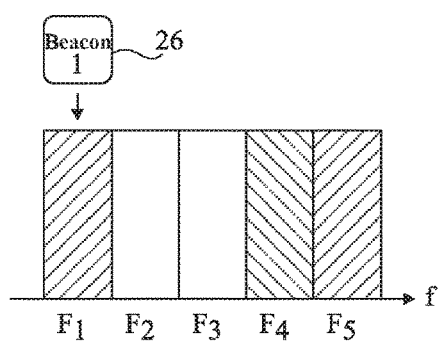
FIG. 4 partially and schematically illustrates the principle of an embodiment of a method of transmission of a frequency plan by a fragmented spectrum telecommunication system with the transmission of a beacon over a single fragment.

FIG. 4 illustrates the principle of the previously-described operating mode. Reference 26 designates a beacon 26 which is transmitted by the master device over a single elementary channel, elementary channel $F_1$ as an example in FIG. 4, while the rest of the data is transmitted according to the principle illustrated in FIG. 3.

According to an embodiment, the remote data transmission method implements a multicarrier modulation method, for example, an OFDM modulation, an FBMC modulation, or a UFMC modulation. In such a method, a signal is transmitted by simultaneous modulation of a plurality of carriers. Each elementary channel may comprise a plurality of carriers. In the case of a fragmented spectrum, a useful signal may be transmitted by only using the carriers which are in elementary channels authorized by the frequency plan and by "turning off" the carriers which are in elementary channels non-authorized by the frequency plan. According to an embodiment, the beacon is totally transmitted by only using the carriers of a single elementary channel while the useful signals may be transmitted by simultaneously modulating the carriers of a plurality of elementary channels, and especially elementary channels which may be separate.

Figure 5:
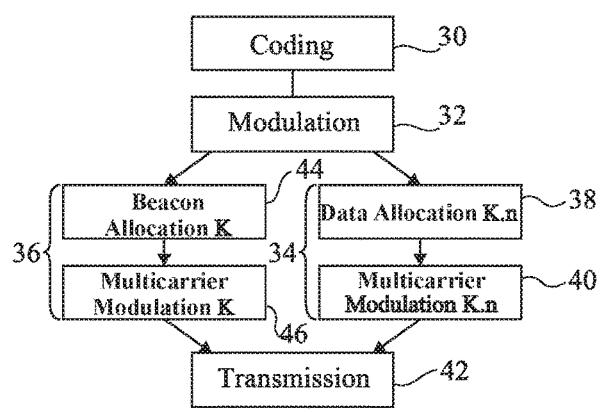
FIG. 5 shows, in the form of a block diagram, an embodiment of a method of transmitting a frequency plan according to the principle illustrated in FIG. 4.

FIG. 5 shows, in the form of a block diagram, an embodiment of a method of transmission of a beacon or of useful signals by master device 12.

At step 30, master device 12 carries out an operation of coding of the digital data to be transmitted. The coding step may for example comprise a convolutional coding. The method carries on at step 32.

At step 32, master device 12 performs a first modulation of the coded digital data to provide digital symbols. The first modulation may correspond to a phase and/or amplitude modulation, for example, a quadrature amplitude modulation QAM, or a phase-shift keying modulation PSK. In the case where the symbols provided at step 32 are intended to form a useful signal, the method carries on at step 34. In the cases where the digital symbols provided at step 32 are intended to form a beacon, the method carries on at step 36.

At step 34, master device 12 carries out a second modulation of the digital symbols provided at step 32, which allows a simultaneous transmission thereof over a plurality of elementary channels. The second modulation may be any type of modulation, for example, a Gaussian minimum shift keying modulation or GMSK modulation, or a spread spectrum modulation. Preferably, the second modulation is a multicarrier modulation on carriers distributed over a plurality of elementary channels. In this case, step 34 comprises a first step 38 where the digital symbols provided at step 32 may be distributed on a plurality of carriers which belong to a plurality of elementary channels. In the case where the spectrum can be divided into n elementary channels each comprising K carriers, the digital symbols provided at step 32 are distributed at step 38 over K.n carriers. Digital symbol '0' is assigned to carriers belonging to non-authorized elementary channels. Step 34 further comprises a step 40 during which master device 12 carries out the actual multicarrier modulation. In the case of an OFDM modulation, step 40 may comprise determining an inverse fast Fourier transform IFFT of the digital symbols distributed at step 38 over a number K.n of carriers. The method carries on at step 42.

At step 42, the modulated carriers are transmitted by an antenna. According to an embodiment, the transmission to the antenna is preceded by a step of frequency transposition by a radiofrequency stage.

At step 36, master device 12 carries out a modulation of the digital symbols provided at step 32, which allows a simultaneous transmission thereof over a single elementary channel. As an example, this modulation is a multicarrier modulation on carriers distributed over a single elementary channel. In this case, step 36 comprises a first step 44 where the digital symbols provided at step 32 are distributed over a plurality of carriers which belong to a single elementary channel. In the case where the spectrum can be divided into n elementary channels each comprising K carriers, the digital symbols provided at step 32 are distributed at step 44 over K carriers belonging to a single elementary channel. Step 36 further comprises a step 46 at which master device 12 carries out the actual multicarrier modulation. In the case of an OFDM modulation, step 46 may comprise determining an IFFT of the digital symbols distributed at step 44 over a number K of carriers. The method carries on at step 42.

Figure 6:
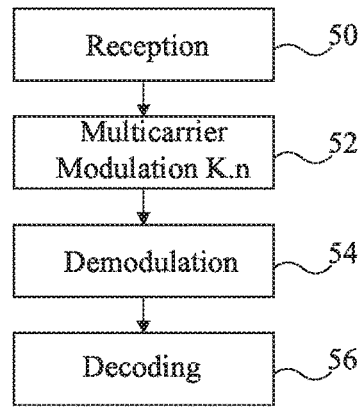
FIG. 6 shows, in the form of a block diagram, an embodiment of a method of data reception by a slave device of a fragmented spectrum telecommunication system.

FIG. 6 shows, in the form of a block diagram, the steps of an embodiment of a method of reception by slave device 14 of signals transmitted by master device 12.

At step 50, the signals transmitted by master device 12 are received by slave device 14. The reception method carries on at step 52.

At step 52, slave device 14 performs a first demodulation, which corresponds to the function inverse to the second modulation implemented by master device 12. As an example, the first demodulation is a multicarrier demodulation over a number K.n of carriers. In the case of an OFDM demodulation, step 52 may comprise a step of determining a fast Fourier transform or FFT over K.n carriers and a sampling step providing a succession of digital symbols. The method carries on at step 54.

At step 54, slave device 14 performs a second demodulation of the digital symbols provided at step 52, which corresponds to the inverse of the first modulation implemented by master device 12. The method carries on at step 56.

At step 56, slave device 14 decodes the binary data obtained at step 54, which corresponds to the inverse of the coding implemented by master device 12 at previously-described step 30.

According to an embodiment, the same reception method is implemented by slave device 14 whether the signals transmitted by master 12 correspond to a beacon or to useful signals. For example, in the case where an OFDM modulation over K.n carriers is implemented at step 40, step 54 may comprise determining a FFT on a window corresponding to K.n carriers and which, after sampling, provides, for each multicarrier symbol, K.n digital symbols associated with the n elementary channels. To search for a beacon, slave device 14 may determine, for each elementary channel, whether the digital symbols successively transmitted for this elementary channel correspond, after demodulation step 54 and decoding step 56, to the beacon. Considering that slave device 14 can determine that a beacon is transmitted over an elementary channel within a time $T_e$, the maximum time taken by the scanning is $n.T_e$.

According to another embodiment, during the search for the beacon, slave device 14 may implement, at step 52, a multicarrier demodulation different from that implemented for the reception of useful signals. In the case where an OFDM modulation is implemented at step 40, step 54 may then comprise determining a FFT on a window corresponding to K carriers associated with a single elementary channel and which provides, after the sampling, K digital symbols associated with this elementary channel. Preferably, K is a power of 2. To search for a beacon, slave device 14 may successively determine, for each elementary channel, whether the digital symbols transmitted for this elementary channel correspond, after demodulation step 54 and decoding step 56, to the beacon. Considering that slave device 14 can determine that a beacon is transmitted over an elementary channel within a time $T_e$, the time taken by the scanning is $n.T_e$.

The time taken by the scanning operation is thus decreased with respect to the case where the beacon would be transmitted, like the useful signals, by simultaneous modulation over a plurality of elementary channels.

According to an embodiment, the beacon is regularly transmitted, for example, periodically, by master device 12. This enables a slave device 14 desiring to take part in telecommunication system 10 to rapidly obtain the frequency plan. Preferably, the beacon is transmitted over the same elementary transmission channel as long as the frequency plan is not modified.

Figure 7:
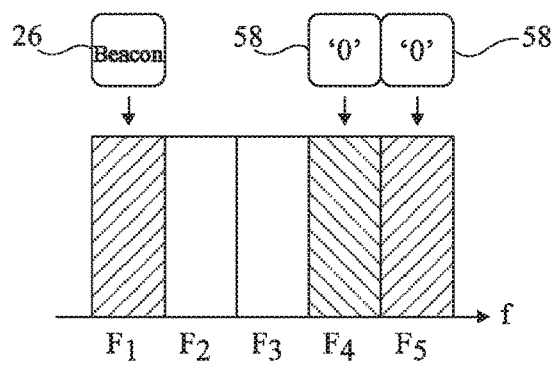
FIG. 7 partially and schematically illustrates the principle of another embodiment of a method of transmission of a frequency plan in a beacon by a fragmented spectrum telecommunication system.

FIG. 7 illustrates the principle of another embodiment of a method of transmitting a beacon over a fragmented spectrum. In this embodiment, beacon 26 is provided by master device 12 over a single elementary channel, for example, elementary channel $F_1$ in FIG. 7, and a digital symbol '0' is transmitted over each other elementary channel as indicated by reference 58 in FIG. 7.

Figure 8:
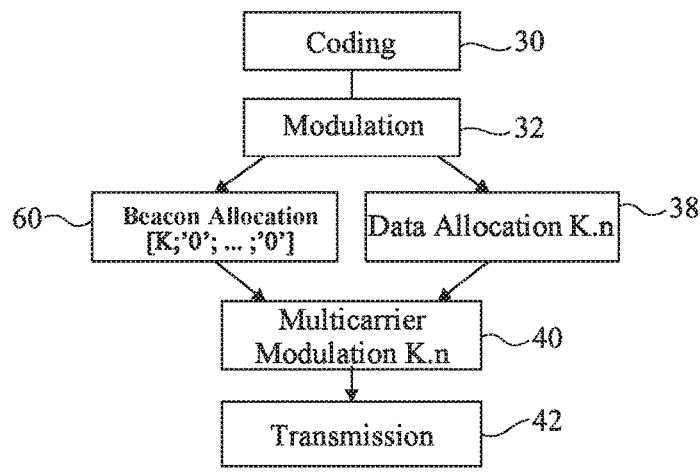
FIG. 8 shows, in the form of a block diagram, another embodiment of a method of transmitting a frequency plan according to the principle illustrated in FIG. 7.

FIG. 8 shows, in the form of a block diagram, an embodiment of a method of transmission of a beacon and of useful signals by master device 12 according to the principle illustrated in FIG. 7.

The method comprises previously-described steps 30, 32, 38, 40, and 42. Previously-described step 36 is replaced with a step 60 during which the digital symbols provided at step 32 and corresponding to a beacon are distributed over K carriers associated with a single elementary channel while digital symbol '0' is distributed over the carriers of the other elementary channels to form a vector of size K.n. The method carries on at step 40, previously described, where a multicarrier modulation over K.n carriers is carried out.

An advantage of the present embodiment over the embodiment previously described in relation with FIG. 5 is that the same multicarrier modulation method can be implemented whether the digital symbols to be transmitted correspond to a beacon or to useful signals. In particular, in the case of a multicarrier modulation of OFDM type, the determination of an inverse fast Fourier transform over K.n carriers may be carried out at the same time for the transmission of useful signals and the transmission of a beacon.

Figure 9:
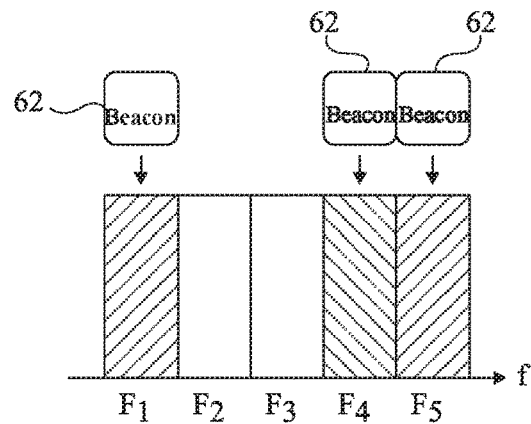
FIG. 9 partially and schematically illustrates the principle of another embodiment of a method of transmission of a frequency plan by a fragmented spectrum telecommunication system with a duplication of the beacon on each fragment.

FIG. 9 illustrates the principle of another embodiment of a method of transmitting a beacon over a fragmented spectrum. In this embodiment, beacon 62 is provided by master device 12 independently over each elementary channel over which a transmission is authorized. Thereby, during the search for the beacon by slave device 14, if the beacon is not correctly received over one of the elementary channels, slave device 14 can determine the beacon based on the digital symbols transmitted over another elementary channel. The beacon transmission robustness is thus increased.

Figure 10:
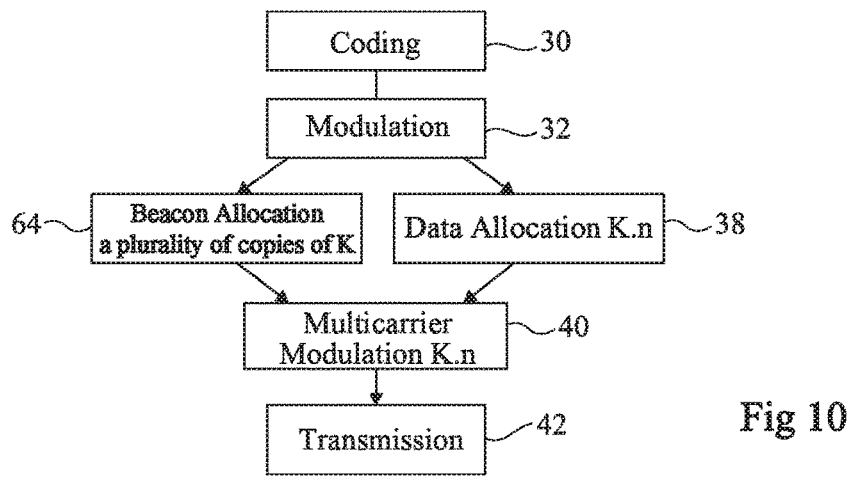
FIG. 10 shows, in the form of a block diagram, another embodiment of a method of transmitting a frequency plan according to the principle illustrated in FIG. 9.

FIG. 10 shows, in the form of a block diagram, an embodiment of a method of transmission of a beacon and of useful signals by master device 12 according to the principle illustrated in FIG. 9.

The method comprises all the steps of the embodiment previously described in relation with FIG. 8, with the difference that step 60 is replaced with a step 64 where the digital signals corresponding to a beacon are repeated over the carriers of each authorized elementary channel. Symbol '0' may be distributed over the carriers of the non-authorized elementary channels to form a vector of size K.n.

The transmission of the beacon by master device 12 may be performed repeatedly, for example, periodically.

In all the discussed embodiments, once the beacon has been determined, slave device 14 extracts the frequency plan from the beacon and can correctly receive the useful signals provided by master device 12 and/or exchange data with the master device or with another slave device 14.

For certain applications, the frequency plan used by master device 12 is likely to be modified. A modification of the frequency plan may in particular translate as the fact that a new frequency plan is transmitted over an elementary channel different from the old frequency plan.

It is desirable for the slave devices 14 which already take part in telecommunication system 10 not to have to search for a new beacon on transmission of the new frequency plan. Indeed, such an operation might translate as an interruption of the reception of useful signals by slave devices 14 already taking part in telecommunication system 10.

Figure 11:
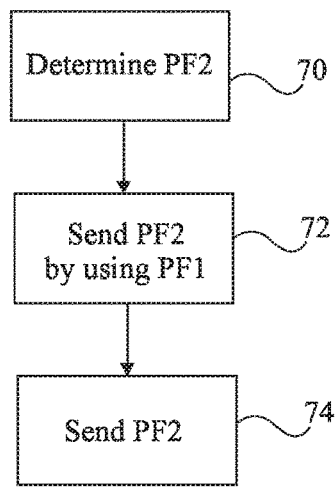
FIG. 11 shows, in the form of a block diagram, an embodiment of a method of updating a frequency plan on a fragmented spectrum wireless network.

FIG. 11 shows, in the form of a block diagram, an embodiment of a method of transmission by master device 12 successively of a first frequency plan PF1 and of a second frequency plan PF2.

At step 70, the master device determines a new frequency plan PF2 while keeping on transmitting, for example, at a regular interval, a beacon containing frequency plan PF1. The beacon containing frequency plan PF1 is thus transmitted over the elementary channel provided for this purpose by frequency plan PF1. Step 70 may be started when master device 12 has to use a new frequency plan. As an example, in the case of TVWS, master device 12 may correspond to a device of signal transmission in white spaces and the request for use of a new frequency plan may be transmitted to master device 12 by a database, spectrum analysis elements, or an official regulation organism. Such a situation may for example be encountered when the master device is mobile and crosses areas where the authorized white spaces differ. The method carries on at step 72.

At step 72, while first frequency plan PF1 is still in use, the method transmits frequency plan PF2 with the beacon used up to then to transmit frequency plan PF1, and specifies a reference time from which frequency plan PF2 should be used. Such a modified beacon containing frequency plan PF2 is thus transmitted over the elementary channel provided for this purpose by frequency plan PF1. The method carries on at step 74.

At step 74, after the reference time, master device 12 uses frequency plan PF2 and transmits a beacon containing frequency plan PF2 by using the elementary channel provided for this purpose by frequency plan PF2.

Various embodiments with different variations have been described hereabove. It should be noted that those skilled in the art may combine various elements of these various embodiments and variations without showing any inventive step. As an example, the embodiment previously described in relation with FIG. 11 of transition from a first frequency plan to a second frequency plan may be implemented with any of the embodiments of frequency plan transmission methods previously described in relation with FIGS. 5, 8, and 10. Further, the specific embodiments previously described for an OFDM modulation may be adapted to other types of multicarrier modulations, particularly an FBMC or UFMC modulation.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of remote data transmission over a frequency spectrum divided into a plurality of different elementary channels, between a first device and a second device, comprising:
   transmission by the first device of a first signal, said first signal comprising a succession of first data, said transmission of said first signal being performed by modulation of the first data simultaneously over a number of elementary channels of the plurality of elementary channels;
   transmission of a second signal representative of a plan of frequency allocation of usable elementary channels of the plurality of elementary channels, said second signal comprising a succession of second data, said transmission of said second signal being performed at least by modulation of all the second data over a single elementary channel from among said number of elementary channels;
   transmission of forth data representative of a new plan of frequency allocation of the usable elementary channels of the plurality of elementary channels by modulation on said single elementary channel and representative of a time of beginning of use of the new plan; and
   from said time, transmission of fifth data representative of the new plan by modulation of the fifth data over a new elementary channel different from said single elementary channel.

2. The method of claim 1, wherein the modulation is a multicarrier modulation.

3. The method of claim 1, wherein the second device successively determines, for each elementary channel from among at least certain elementary channels of the plurality of elementary channels, whether all the second data have been transmitted by modulation over said elementary channel.

4. The method of claim 1, comprising transmitting the second signal independently by modulation of all the second data over each of at least two unique elementary channels from among the plurality of elementary channels.

5. The method of claim 1, wherein each elementary channel comprises carriers, the method comprising a step of determining first symbols based on first data, a step of distributing the first symbols over first carriers associated with a number of elementary channels of the plurality of elementary channels, and a step of modulating the first carriers with the first symbols, the method further comprising a step of determining second symbols based on the second data, a step of distributing the second symbols over at least second carriers associated with said unique elementary channels, and a step of modulating the second carriers with the second symbols.

6. The method of claim 5, comprising modulating the carriers other than the second carriers with a no-data-transmission symbol.

7. The method of claim 5, comprising modulating with the second symbols at least third carriers different from the second carriers and contained in an elementary channel different from said unique elementary channel.

8. The method of claim 1, wherein the modulation is an OFDM modulation, an FBMC modulation, or a UFMC modulation.

9. The method of claim 1, wherein at least two elementary channels of said number of elementary channels are separated by at least one elementary channel of the plurality of elementary channels on which the first data are not modulated.

10. A device of remote data transmission over a frequency spectrum divided into a plurality of different elementary channels comprising a circuit capable of:
transmitting a first signal, said first signal comprising a succession of first data, said transmission of said first signal being performed by modulation of the first data simultaneously over a number of elementary channels of the plurality of elementary channels;
transmitting a second signal representative of a plan of frequency allocation of usable elementary channels of the plurality of elementary channels, said second signal comprising a succession of second data, said transmission of said second signal being performed at least by modulation of all the second data over a single elementary channel from among said number of elementary channels;
transmitting fourth data representative of a new plan of frequency allocation of the usable elementary channels of the plurality of elementary channels by modulation on said single elementary channel and representative of a time of beginning of use of the new plan; and
from said time, transmitting fifth data representative of the new plan by modulation of the fifth data over a new elementary channel different from said single elementary channel.

11. A system of remote data transmission over a frequency spectrum divided into a plurality of elementary channels, comprising at least a first device of claim 10 and at least a second device capable of successively determining, for each elementary channel from among at least certain elementary channels of the plurality of elementary channels, whether all the second data have been transmitted by modulation over said elementary channel.

* * * * *